US008371473B2

(12) United States Patent
Scribner et al.

(10) Patent No.: US 8,371,473 B2
(45) Date of Patent: Feb. 12, 2013

(54) POTTING SYSTEM

(76) Inventors: Richard C Scribner, Simi Valley, CA (US); Harold W Swartz, Walhonding, OH (US)

( * ) Notice: Subject to any disclaimer, the term of this patent is extended or adjusted under 35 U.S.C. 154(b) by 164 days.

(21) Appl. No.: 12/637,585

(22) Filed: Dec. 14, 2009

(65) Prior Publication Data
US 2011/0084088 A1    Apr. 14, 2011

Related U.S. Application Data

(63) Continuation-in-part of application No. 12/611,040, filed on Nov. 2, 2009, now abandoned.

(60) Provisional application No. 61/250,298, filed on Oct. 9, 2009.

(51) Int. Cl.
*B65D 25/10*    (2006.01)

(52) U.S. Cl. ...... 220/751; 220/23.2; 220/23.4; 220/475; 47/39; 47/50; 47/65.5; 47/67; 248/218.4; 248/219.2; 248/219.3; 248/690

(58) Field of Classification Search .............. 220/23.83, 220/475, 751, 23.2, 23.4; 47/65.5, 67, 83, 47/39, 50, 67.83; 248/218.4, 219.2, 219.3, 248/690
See application file for complete search history.

(56) References Cited

U.S. PATENT DOCUMENTS

| | | | |
|---|---|---|---|
| 4,708,256 A * | 11/1987 | Intardonato | 220/23.4 |
| 6,269,589 B1 * | 8/2001 | Bouler | 47/65.5 |
| 2004/0064923 A1 * | 4/2004 | Gzybowski | 24/399 |
| 2005/0061934 A1 * | 3/2005 | Steven et al. | 248/218.4 |
| 2006/0076355 A1 * | 4/2006 | Sofy | 220/751 |
| 2006/0201060 A1 * | 9/2006 | Warman et al. | 47/65.5 |
| 2008/0245937 A1 * | 10/2008 | Connor | 248/215 |

* cited by examiner

*Primary Examiner* — Anthony Stashick
*Assistant Examiner* — Elizabeth Volz
(74) *Attorney, Agent, or Firm* — James J. Ruttler; Michael Gibbons

(57) ABSTRACT

This invention relates generally to mechanics, and more specifically, to a potting system. In one embodiment, the invention includes a potting system including one or more bands; and one or more pots configured to suspend from the one or more bands. In a further embodiment, the one or more pots configured to suspend from the one or more bands includes one or more pots configured to link with adjacent pots.

20 Claims, 9 Drawing Sheets

POTTING SYSTEM

PRIORITY CLAIM

This application is a continuation-in-part of U.S. non-provisional patent application Ser. No. 12/611,040 filed on Nov. 2, 2009, which application claims the benefit of U.S. provisional patent application Ser. No. 61/250,298 filed Oct. 9, 2009. The foregoing applications are hereby incorporated by reference in their entirety as if fully set forth herein.

FIELD OF THE INVENTION

This invention relates generally to mechanics, and more specifically, to a potting system.

SUMMARY

This invention relates generally to mechanics, and more specifically, to a potting system. In one embodiment, the invention includes a potting system including one or more bands; and one or more pots configured to suspend from the one or more bands. In a further embodiment, the one or more pots configured to suspend from the one or more bands includes one or more pots configured to link with adjacent pots. In one embodiment, the invention includes a potting system including one or more pots configured to suspend from one or more bands, wherein the one or more pots configured to suspend from one or more bands includes one or more pots configured to link with adjacent pots. In one embodiment, the invention includes a potting system including one or more pots configured to suspend from one or more structures, wherein the one or more pots configured to suspend from one or more structures includes one or more pots configured to link with adjacent pots.

BRIEF DESCRIPTION OF THE DRAWINGS

Embodiments of the present invention are described in detail below with reference to the following drawings.

DETAILED DESCRIPTION

This invention relates generally to mechanics, and more specifically, to a potting system. Specific details of certain embodiments of the invention are set forth in the following description and in FIGS. 1-18 and APPENDIX A to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
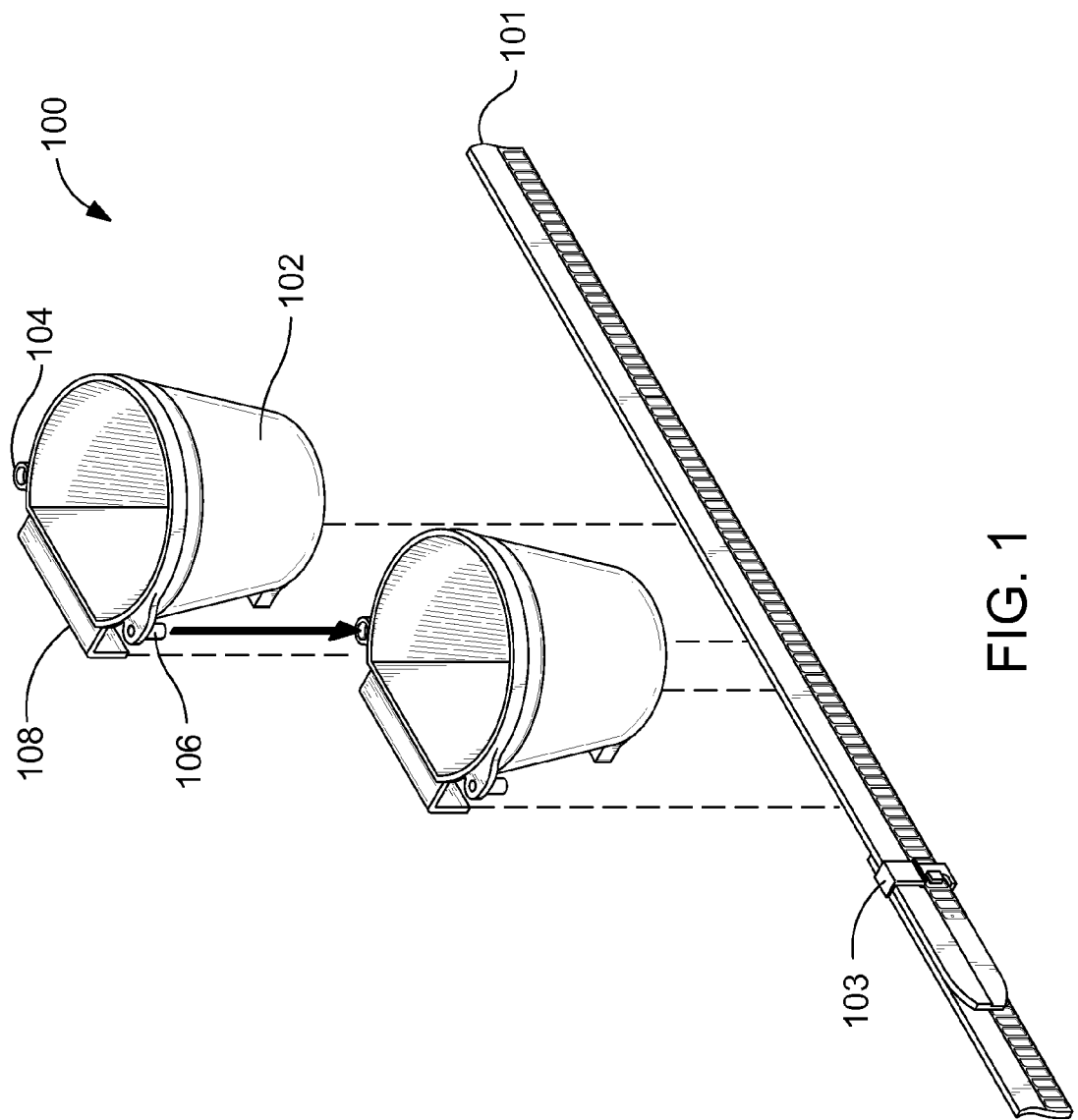
FIG. 1 is an exploded view of a potting system, in accordance with an embodiment of the invention.
Figure 2:
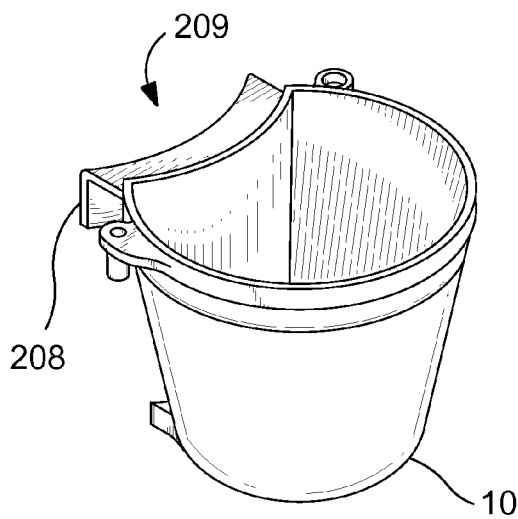
FIGS. 2-5 are perspective views of pots having alternative suspension mechanisms for use in a potting system, in accordance with various embodiments of the invention.
Figure 3:
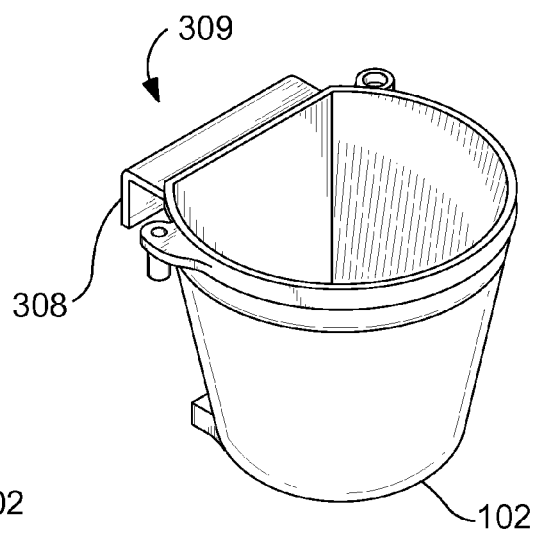
Figure 4:
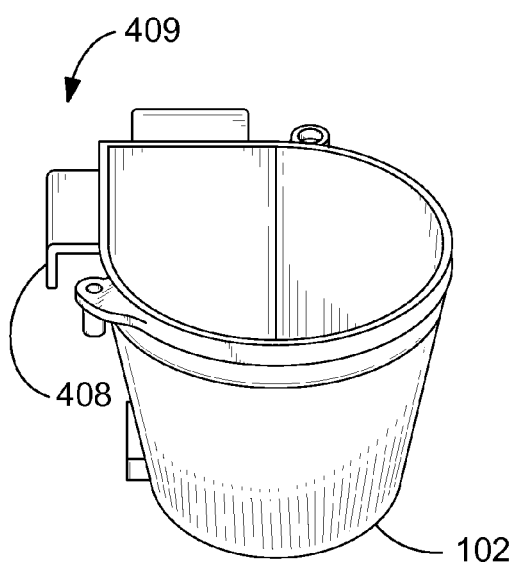
Figure 5:
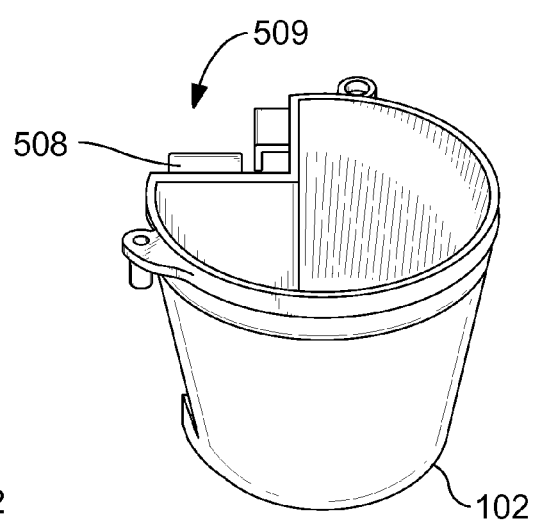

FIG. 1 is an exploded view of a potting system 100, in accordance with an embodiment of the invention. In some embodiments, a potting system 100 includes one or more bands 101; and one or more pots 102 configured to suspend from the one or more bands 101 using a suspension mechanism 108. In some embodiments, a potting system 100 includes one or more pots 102 configured to link with adjacent pots using a linking mechanism 104 and/or 106.

Figure 7:
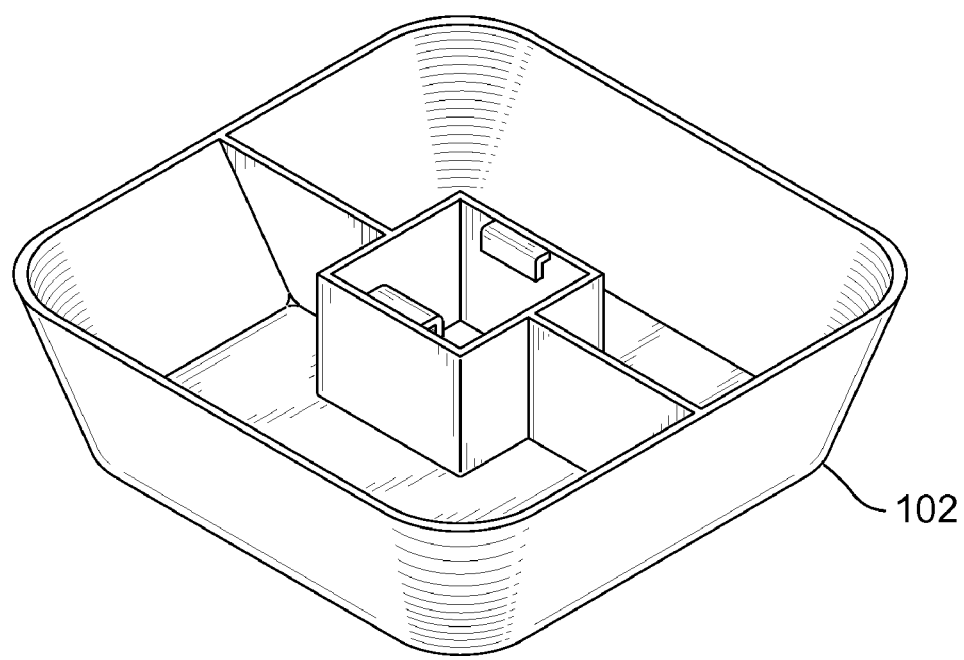
Figure 8:
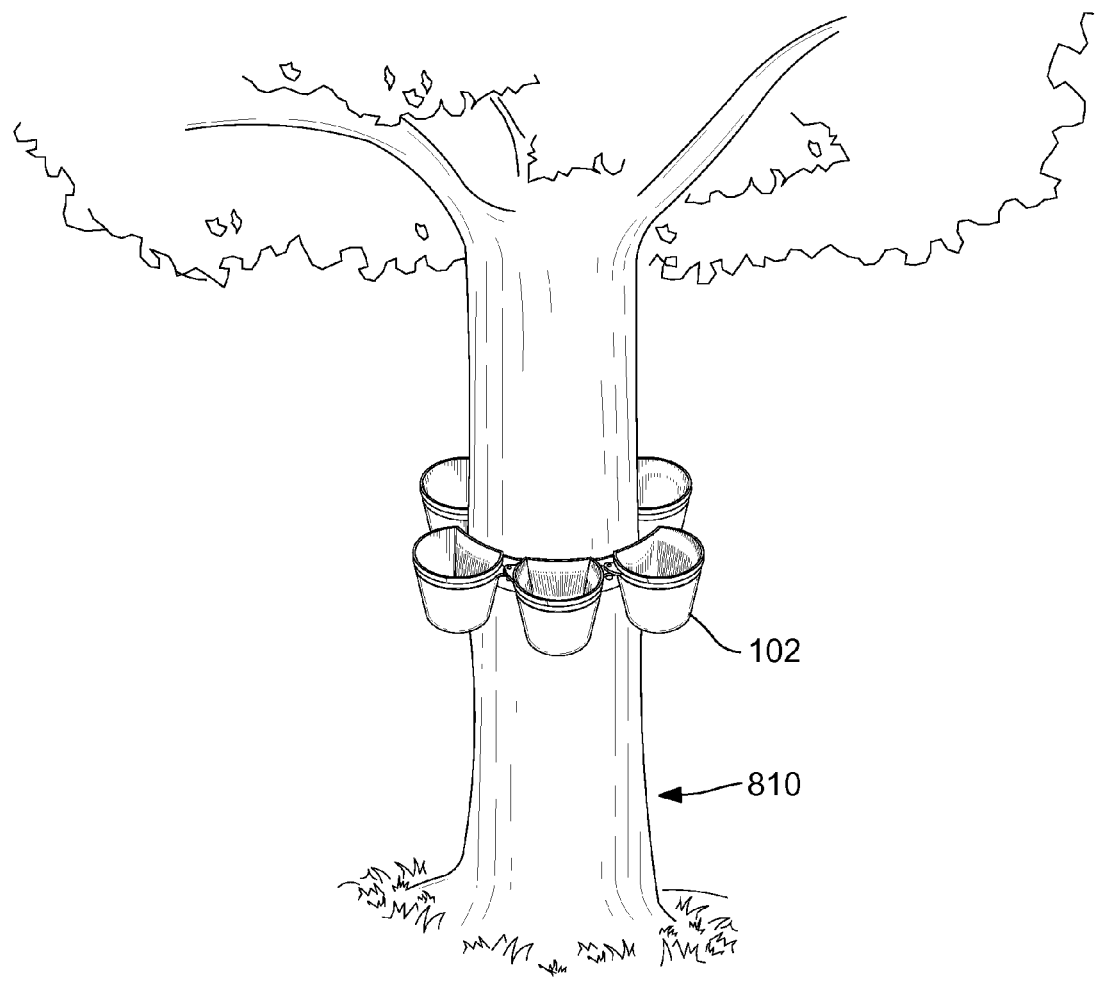
FIGS. 8-10 are perspective views of a potting system in association with alternative structures, in accordance with various embodiments of the invention.
Figure 9:
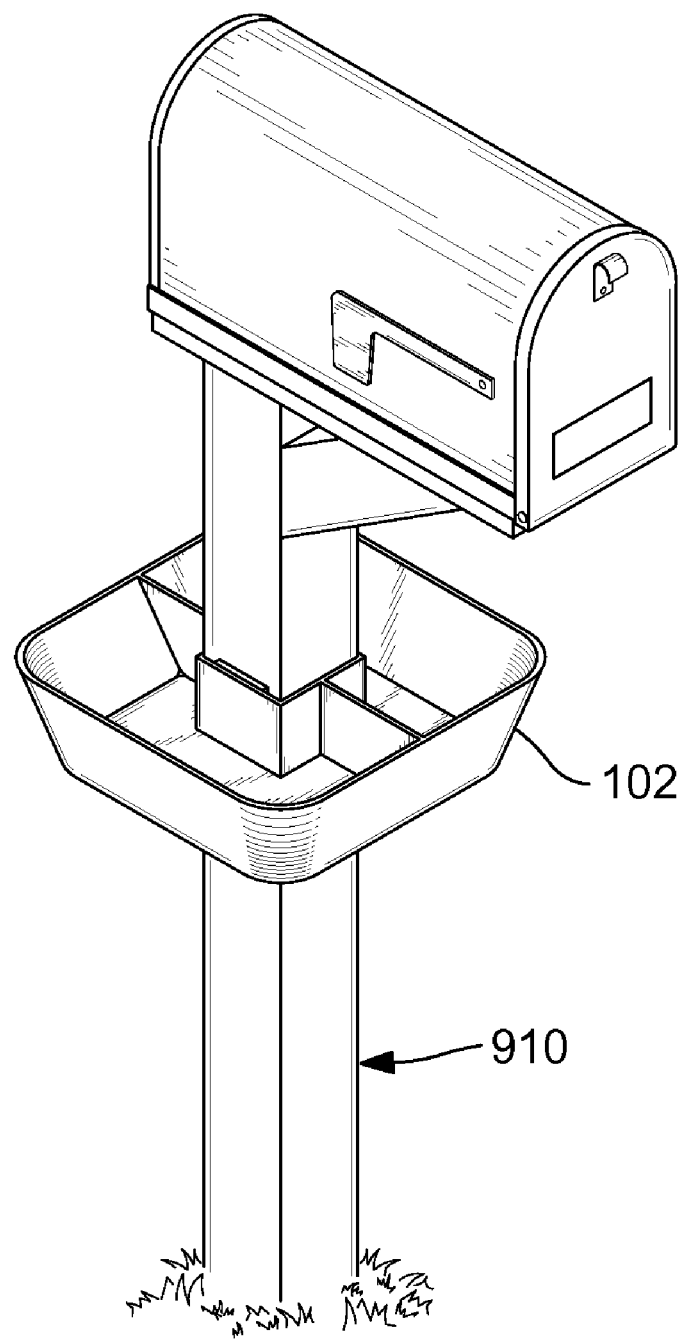
Figure 10:
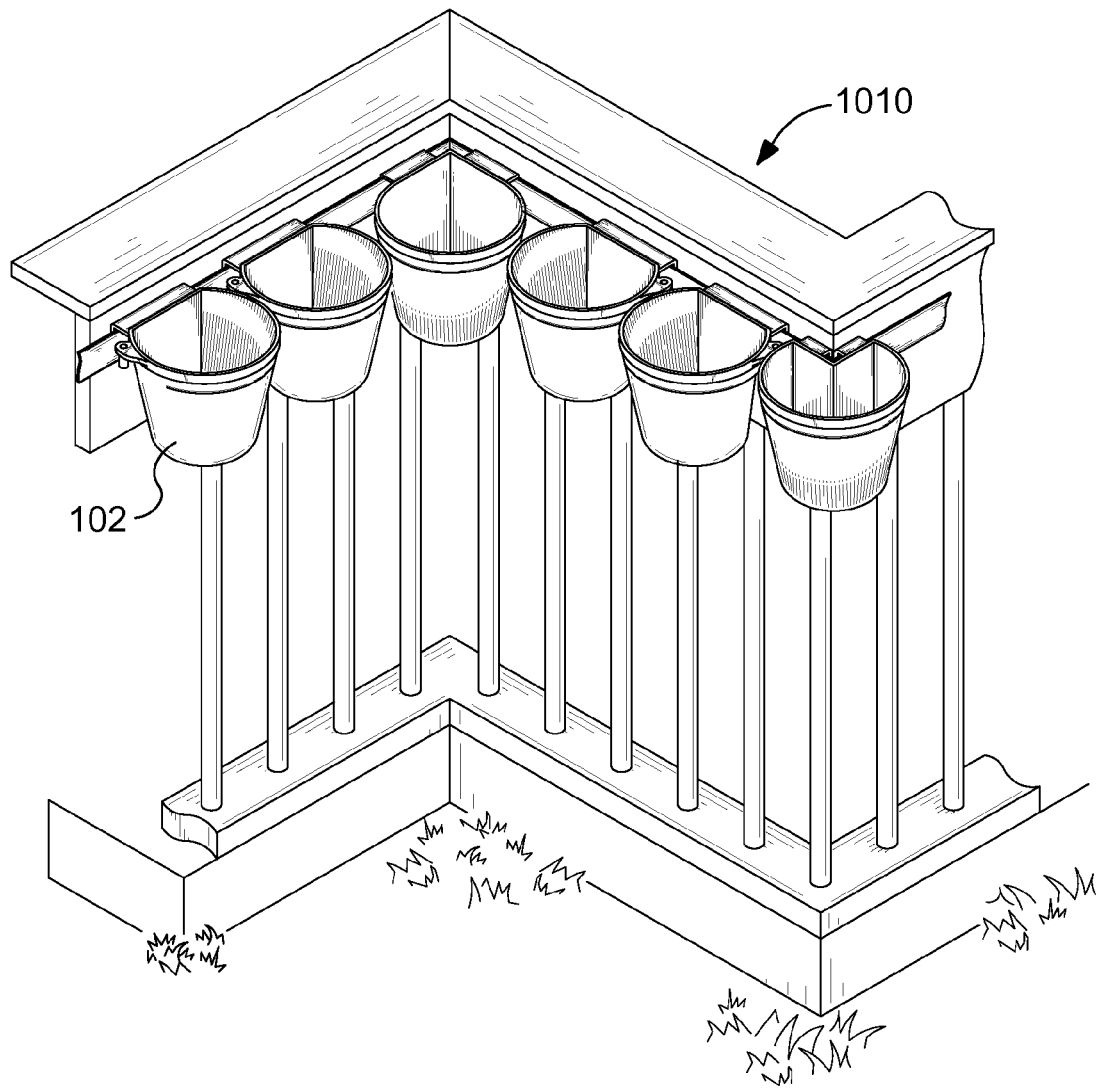

In some embodiments, one or more bands 101 are an elongated structure, plate-like structure, or other similar structure. In some embodiments, one or more bands 101 are composed of a flexible material, such as plastic, leather, metal, or other similar material. In some embodiments, one or more bands 101 include one or more linear bands (FIG. 1). In some embodiments, one or more bands 101 include one or more curvilinear or angled bands. For example, one or more bands 101 may define a sine-like wave or other regular or irregular curve. Alternatively, one or more bands 101 may define a zig-zag line or other regular or irregular angle. In some embodiments, one or more bands 101 include a malleable band that may assume a variety of customized lines, curves, or angles. In some embodiments, one or more bands 101 include one or more bands configured to tensionally wrap around a structure using a locking mechanism 103 (FIGS. 7-9). For example, one or more bands 101 may include an integrated gear rack with a ratchet within a small case opening as a locking mechanism 103. In some embodiments, the one or more bands 101 may include gears on one side and/or gears on both sides (gears may also be described as steps). In some embodiments, the one or more bands 101 may include gears across an entire width or a partial width of a side. In some embodiments, the one or more bands 101 may include gears on a top and bottom portion of a side. In some embodiments, the one or more bands 101 may include gears along an entire length or a partial length of a side. Alternatively, one or more bands 101 may include a buckle, snap, button, hook and loop fastener, magnet, or other similar fastener as a locking mechanism 103. In some embodiments, one or more bands 101 may be configured to fasten to a structure (FIG. 10). For example, one or more bands 101 may be configured to fasten to a structure using clips, hooks, nails, staples, adhesive, or other similar methodology. In some embodiments, one or more bands 101 include one or more extensible bands. For example, one or more bands 101 may include telescoping portions. Alternatively, one or more bands 101 may include a mechanism to link adjacent bands, such as using an integrated gear rack with a ratchet within a small case opening, a buckle, snap, button, hoop and loop fastener, magnet, or other similar fastener. In some embodiments, one or more bands 101 are omitted. In some embodiments, one or more bands 101 may range from ⅛ inch to 6 inches wide. In some embodiments, one or more bands 101 may range from 3 inches to 50 feet in length. In some embodiments, one or more bands 101 may range from ⅙ inch to 4 inches thick.

In some embodiments, one or more pots 102 are configured to link with adjacent pots using a linking mechanism 104 and/or 106 to define a chain of pots (FIG. 10). For example, one or more pots 102 may be configured to link with adjacent pots using opposing male and female connectors as a linking mechanism 104 and/or 106. Alternatively, one or more pots 102 may be configured to link with adjacent pots using a snap, button, hoop and loop fastener, magnet, or other similar fastener. Additionally, one or more pots 102 may be configured to link with adjacent pots using a connection that is optionally severable. Moreover, one or more pots 102 may be configured to link with adjacent pots using an elastic ring-set. In some embodiments, one or more pots 102 are configured to link with adjacent pots using a linking mechanism 104 and/or 106 to define a ring or grouping of pots (FIGS. 7-9). For example, one or more pots 102 may be configured to link with adjacent pots using a linking mechanism 104 and/or 106 to define a circular, oval, or elliptical ring. Alternatively, one or more pots 102 may be configured to link with adjacent pots using a linking mechanism 104 and/or 106 to define a square, triangle, rectangle, or other similar regular or irregular grouping. In some embodiments, one or more pots 102 are configured to link with adjacent pots horizontally (FIG. 10). For example, one or more pots 102 may be configured to link with adjacent pots horizontally in two or three dimensions, such as along a porch railing. In some embodiments, one or more pots 102 are configured to link with adjacent pots vertically or angularly. For example, one or more pots 102 may be configured to link with adjacent pots vertically or angularly in two or three dimensions, such as along stairs.

In one particular example, a spacer belt (not illustrated) is configured to permit linkage of adjacent pots that are separated by a certain distance. In some embodiments, the spacer belt includes a male connector on one end and a plurality of female connectors along its length. Accordingly, the male connector of the spacer belt is configured to link with one pot using female connector linking mechanism 104. Thereafter, the spacer belt may be cut to a desired distance of separation with end-most female connector of the spacer belt being configured to link with another pot using male connector linking mechanism 106. Accordingly, the spacer belt permits linkage of adjacent pots that are separated by a distance. Such may be useful to jump over an interruption such as a vertical beam along a railing or even to support artistic arrangements of non-continuously mounted pots. The spacer belt may be composed of rubber, leather, plastic, wood, metal, or some other synthetic or natural material. The spacer belt may be anywhere from a half-inch in length to a hundred or more feet in length. The spacer belt may include anywhere from one to one-thousand or more female connectors. Optionally, the spacer belt may include a slidable female connector as a substitute for a plurality of female connectors. Additionally, the spacer belt may be cut or punched to define the female connector.

FIGS. 2-5 are perspective views of pots having alternative suspension mechanisms for use in a potting system, in accordance with various embodiments of the invention. In some embodiments, one or more pots 102 are configured to suspend from one or more bands using one or more hooks 108 (FIG. 1). For example, one or more pots 102 may be configured to suspend from one or more bands using a narrow hook, an elongated hook, or a series of hooks 108. Additionally, one or more pots 102 may be configured to suspend from a top, middle, or bottom portion of one or more bands using one or more hooks 108. Furthermore, one or more pots 102 may be configured to suspend from one or more bands using one or more downward, sideward, upward, or multi-direction hooks. In some embodiments, one or more pots 102 are configured to suspend from one or more bands using one or more concave hooks 208. For example, one or more pots 102 may be configured to suspend from one or more bands around a curved surface using one or more concave hooks 208. In some embodiments, one or more pots 102 are configured to suspend from one or more bands using one or more flat hooks 308. For example, one or more pots 102 may be configured to suspend from one or more bands along a flat surface using one or more flat hooks 308. In some embodiments, one or more pots 102 are configured to suspend from one or more bands using one or more everted hooks 408. For example, one or more pots 102 may be configured to suspend from one or more bands at an inside corner using one or more everted hooks 408. In some embodiments, one or more pots 102 are configured to suspend from one or more bands using one or more inverted hooks 508. For example, one or more pots 102 may be configured to suspend from one or more bands at an outside corner using one or more inverted hooks 508. Additionally, one or more pots 102 may be configured to suspend from one or more bands along a variable surface using a combination of concave hooks 208, flat hooks 308, everted hooks 408, and inverted hooks 508 (FIG. 10). In some embodiments, one or more pots 102 are configured to suspend from one or more bands using one or more substantially linear, curvilinear, or angled hooks. For example, one or more pots 102 may be configured to suspend from one or more horizontally oriented bands using one or more linear hooks. Additionally, one or more pots 102 may be configured to suspend from one or more curvilinear oriented bands using one or more curvilinear hooks (e.g. such as to provide upright pot orientation on a band curving up a surface). Furthermore, one or more pots 102 may be configured to suspend from one or more angle oriented bands using one or more angled hooks (e.g. such as to provide upright pot orientation on a band zigzagging on a surface). In some embodiments, one or more pots 102 are configured to suspend from one or more bands using one or more modifiable, movable, rotatable, shiftable, slidable, or adjustable hooks. In some embodiments, one or more pots 102 are configured to suspend from a structure without one or more bands using one or more hooks 108.

In some embodiments, one or more pots 102 are configured to suspend from one or more bands using one or more fasteners. For example, one or more pots 102 may be configured to suspend from one or more bands using a buckle, snap, button, hook and loop fastener, magnet, nail, rivet, staple, screw, bolt, or other similar fastener. In some embodiments, one or more pots 102 may be configured to suspend from one or more bands using a connection that is optionally severable, rotatable, shiftable, or slidable (e.g. one or more pots 102 may be substantially permanently connected to one or more bands). In some embodiments, one or more pots 102 may be configured to suspend from a structure without one or more bands using one or more fasteners.

In some embodiments, one or more pots 102 having a concave portion 209 are configured to suspend from one or more bands. For example, one or more pots 102 having a concave portion 209 may be configured to suspend from one or more bands around a curved surface. In some embodiments, one or more pots 102 having a flat portion 309 are configured to suspend from one or more bands. For example, one or more pots 102 having a flat portion 309 may be configured to suspend from one or more bands along a flat surface. In some embodiments, one or more pots 102 having an everted portion 409 are configured to suspend from one or more bands. For example, one or more pots 102 having an everted portion 409 may be configured to suspend from one or more bands at an inside corner. In some embodiments, one or more pots 102 having an inverted portion 509 are configured to suspend from one or more bands. For example, one or more pots 102 having an inverted portion 509 may be configured to suspend from one or more bands at an outside corner. In some embodiments, one or more pots 102 having a shaped portion may be configured to suspend from a structure without one or more bands.

Figure 6:
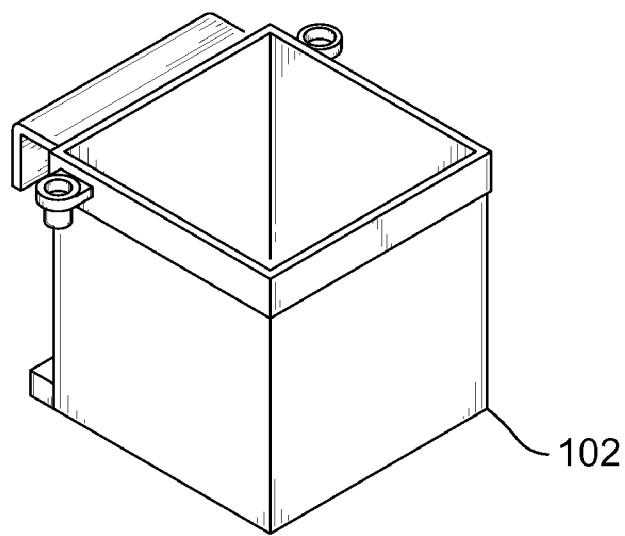
FIGS. 6 and 7 are perspective views of alternatively shaped pots for use in a potting system, in accordance with various embodiments of the invention.

FIGS. 6 and 7 are perspective views of alternatively shaped pots for use in a potting system, in accordance with various embodiments of the invention. In some embodiments, one or more pots 102 having a square shape are configured to suspend from one or more bands. In some embodiments, one or more pots 102 having a circular, rectangle, or other regular or irregular shape are configured to suspend from one or more bands. For example, one or more pots 102 may have a shape configured to suspend from one or more bands around a post or beam. Additionally, one or more pots 102 may have a shape configured to suspend from one or more bands along stairs. Furthermore, one or more pots 102 may have a shape configured to suspend from one or more bands along window bars. In some embodiments, one or more pots 102 having a shape may be configured to suspend from a structure without one or more bands.

In some embodiments, one or more pots 102 are configured to suspend from one or more bands to define a combined square shape. In some embodiments, one or more pots 102 are configured to suspend from one or more bands to define a combined circular, rectangle, or other regular or irregular shape. For example, one or more pots 102 may be configured to suspend from one or more bands around a tree to define a combined circular shape. Additionally, one or more pots 102 may be configured to suspend from one or more bands around a porch beam to define a combined square shape. Furthermore, one or more pots 102 may be configured to suspend from one or more bands along stairs to define a combined stair-like shape. In some embodiments, one or more pots 102 may be configured to suspend from a structure without one or more bands to define a combined shape.

FIGS. 8-10 are perspective views of a potting system in association with alternative structures, in accordance with various embodiments of the invention. In some embodiments, one or more pots 102 are configured to suspend from one or more bands around a tree 810. In some embodiments, one or more pots 102 may be configured to suspend from one or more bands around a bush, branch, water well, building column, flag pole, electric pole, lamp post, or some other similar structure. In some embodiments, one or more pots 102 are configured to suspend from one or more bands around a post 910. In some embodiments, one or more pots 102 may be configured to suspend from one or more bands around a building beam, a fence post, a porch column, or some other similar structure. In some embodiments, one or more pots 102 are configured to suspend from one or more bands horizontally on a beam 1010. In some embodiments, one or more pots 102 are configured to suspend from one or more bands vertically or angularly on a structure. In some embodiments, one or more pots 102 may be configured to suspend from one or more bands below a window, on a porch railing, aside a door, along a wall, along a fence, along a roof line, or some other similar structure. In some embodiments, one or more pots 102 are configured to suspend from a structure without one or more bands. In some embodiments, one or more pots 102 are configured to suspend from a structure using one or more extensions. In some embodiments, one or more extensions are adjustably extendable and retractable.

In some embodiments, one or more pots 102 are configured to include a watering or sprinkling mechanism. For example, the water or sprinkling mechanism may be configured to draw water from a reservoir or to couple with a hose. In some embodiments, a water or sprinkling mechanism includes a control system, such as to allow control of water timing and volume. In some embodiments, one or more pots 102 are configured to include one or more lights, such as for safety or decoration. In some embodiments, one or more pots 102 are configured to include one or more solar cells for providing renewable power, such as for use with a water or sprinkling system, a control system, or lighting.

Figure 11:
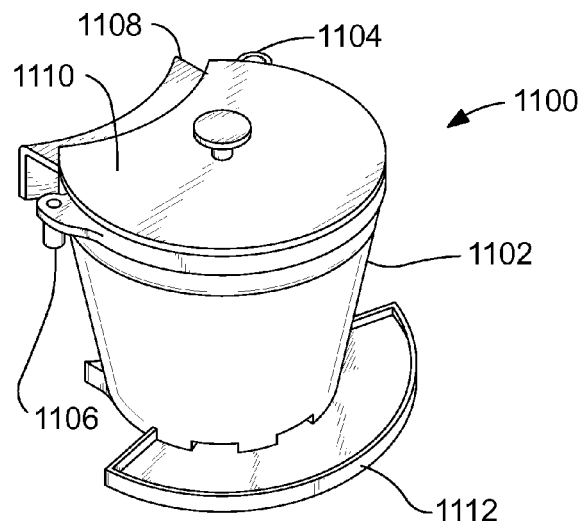
FIG. 11 is a perspective view of a feeder for use in a potting system, in accordance with an embodiment of the invention.

FIG. 11 is a perspective view of a feeder for use in a potting system, in accordance with an embodiment of the invention. In some embodiments, feeder 1100 includes a housing 1102 with a cover 1110 and a dispenser 1112 that is configured to suspend from one or more bands 101 (FIG. 1) using a suspension mechanism 1108. In some embodiments, feeder 1100 is configured to link with adjacent pots, feeders, and/or houses using a linking mechanism 1104 and/or 1106 to define a chain (FIG. 10). Feeder 1100 may be implemented with any embodiment disclosed herein.

In some embodiments, the housing 1102 is configured to receive and store feed, such as bird food, squirrel food, and/or other insect and/or animal food. For example, the housing 1102 may be circular, square, oval, rectangular, and/or any other regular and/or irregular shape. Additionally, the housing 1102 may include heating and/or cooling controls. Alternatively, the housing 1102 may be configured to receive and store multiple types of feed, such as bird food and squirrel food. Likewise, the housing 1102 may include one or a plurality of compartments. Also, the housing 1102 may include a gauge to indicate a level of its contents.

In some embodiments, the dispenser 1112 is configured to dispense feed from the housing 1102. For example, the dispenser 1112 may define a receptacle that receives feed from one or more openings within the housing 1102 under the force of gravity. Alternatively, the dispenser 1112 may dispense feed under mechanical and/or electrical control so as to prevent over-consumption or to govern consumption. Additionally, the dispenser 1112 may be alternatively positioned anywhere relative to the housing 1102, such as below, on a side, above, around, or off the housing 1102. Also, the dispenser 1112 may be differently shaped and/or be comprised of a plurality of dispensers. For example, the dispenser 1112 may circumscribe the entire housing 1102 perimeter or may be limited to only a portion of the housing 1102 perimeter. Additionally, in some embodiments the dispenser 1112 may be movable around the housing 1102 perimeter or shiftable up or down relative to the housing 1102. Moreover, the dispenser 1112 may be integrated with the housing 1102, removable, and/or omitted. Additionally, the dispenser 1112 may include a heating or cooling element.

In some embodiments, the cover 1110 is configured to protect contents of the housing 1102. For example, the cover 1110 may rest over an opening of the housing 1102. Alternatively, the cover 1110 may be securably fixable to the housing 1102, such as through friction, snaps, elasticity, a clasp, threads, or any other similar mechanism. Additionally, the cover 1110 may be differently positioned relative to the housing 1102, such as to a side, below, and/or around the housing 1102. Moreover, the cover 1110 may be differently shaped and/or be comprised of a plurality of covers. Likewise, the cover 1110 may be integrated with the housing 1102 and/or omitted.

Figure 12:
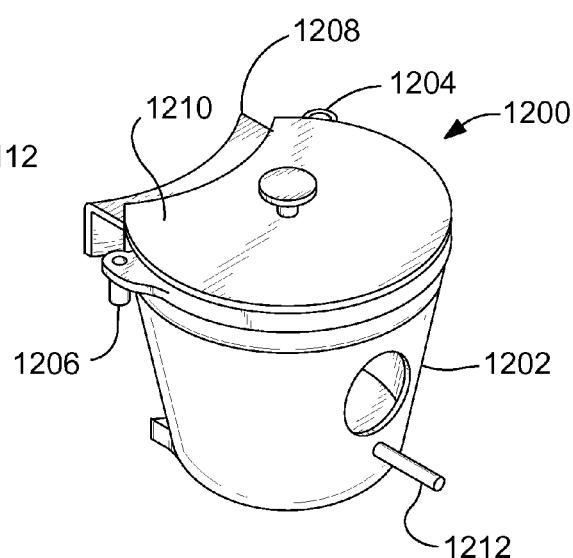
FIG. 12 is a perspective view of a house for use in a potting system, in accordance with an embodiment of the invention.

FIG. 12 is a perspective view of a house for use in a potting system, in accordance with an embodiment of the invention. In some embodiments, house 1200 includes a housing 1202 with a cover 1210 and a post 1212 that is configured to suspend from one or more bands 101 (FIG. 1) using a suspension mechanism 1208. In some embodiments, house 1200 is configured to link with adjacent pots, feeders, and/or houses using a linking mechanism 1204 and/or 1206 to define a chain (FIG. 10). House 1200 may be implemented with any embodiment disclosed herein.

In some embodiments, the housing 1202 is configured to allow ingress and egress of an animal or insect, such as a bird or squirrel. For example, the housing 1202 may include one or more openings, such as on a side, bottom, or top of the housing 1202. Additionally, the housing 1202 may be circular, square, oval, rectangular, and/or any other regular and/or irregular shape. Additionally, the housing 1202 may include heating and/or cooling controls. Alternatively, the housing 1202 may be configured to receive and dispense one or more types of feed, such as bird food or squirrel food. Likewise, the housing 1202 may include one or a plurality of compartments. Also, the housing 1202 may include a window.

In some embodiments, the post 1212 is configured to facilitate ingress and egress from the housing 1202. For example, the post 1212 may be a linear, curvilinear, or circular member that extends from the housing 1202 proximate to an opening in the housing 1202. Additionally, the post 1212 may be configured as a deck off the housing 1202. Alternatively, the post 1212 may extend as a circular member around the housing 1202. Also, the post 1212 may extend partially or entirely around the housing 1202. Further, the post 1212 may be positioned anywhere relative to the housing 1202, such as on a side, bottom, or top of the housing 1202. Additionally, the post 1212 may be supplemented with additional posts or omitted. Also, the post 1212 may include a heating or cooling element.

In some embodiments, the cover 1210 is configured to protect an interior of the housing 1202. For example, the cover 1210 may rest over an opening of the housing 1202. Alternatively, the cover 1210 may be securably fixable to the housing 1202, such as through friction, snaps, elasticity, a clasp, threads, or any other similar mechanism. Additionally, the cover 1210 may be differently position positioned relative to the housing 1202, such as to a side, below, and/or around the housing 1202. Moreover, the cover 1210 may be differently shaped and/or be comprised of a plurality of covers. Likewise, the cover 1210 may be integrated with the housing 1202, permanently mounted to the housing 1202, and/or omitted.

Figure 13:
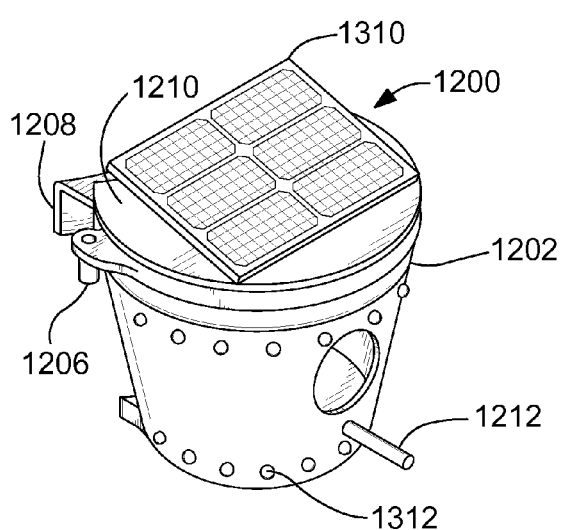
FIG. 13 is a perspective view of a house with solar panels and/or lighting for use in a potting system, in accordance with an embodiment of the invention.

FIG. 13 is a perspective view of a house with solar panels and/or lighting for use in a potting system, in accordance with an embodiment of the invention. In some embodiments, house 1200 includes a housing 1202 with a cover 1210, a post 1212, a solar panel 1310, and lighting 1312 that is configured to suspend from one or more bands 101 (FIG. 1) using a suspension mechanism 1208. In some embodiments, house 1200 is configured to link with adjacent pots, feeders, and/or houses using a linking mechanism 1204 (not visible) and/or 1206 to define a chain (FIG. 10). House 1200 may be implemented with any embodiment disclosed herein.

In some embodiments, the solar panel 1310 is configured to provide a power source to one or more power consuming devices, such as a light, a watering mechanism, a heating element, a cooling element, or other similar power consuming device. For example, the solar panel 1310 may include a single solar cell or a plurality of solar cells. Additionally, the solar panel 1310 may be integrated into the house 1200 or may be mounted to one or more portions of the house 1200. Alternatively, the solar panel 1310 may be positioned on a side, top, bottom, or off of the house 1200. Additionally, the solar panel 1310 may be mechanically or automatically movable, shiftable, detachable, or rotatable, such as to be positioned in a line of the sun or to trace movement of the sun. Also, the solar panel 1310 may be configured to store energy, such as using a battery.

In some embodiments, lighting 1312 is configured to provide illumination for decorative or safety purposes. For example, lighting 1312 may include one or a plurality of lighting elements. Additionally, lighting 1312 may include low or high intensity light or adjustable intensity light. Also, lighting 1312 may be positioned on a side, top, bottom, or interior of the house 1202. Alternatively, lighting 1312 may be configured to direct illumination on an interior of the house 1202. Also, lighting 1312 may be configured to direct illumination on an exterior of the house 1202. Alternatively, lighting 1312 may be configured to direct illumination off of the house 1202, such as onto the ground, along a deck, or up a tree. Further, lighting 1312 may be configured to direct illumination on the post 1212. Moreover, lighting 1312 may be configured to provide a regular or irregular decorative pattern. Additionally, lighting 1312 may illuminate in response to darkness or proximity/absence of an animal, insect, human, or other object.

Figures 14, 15:
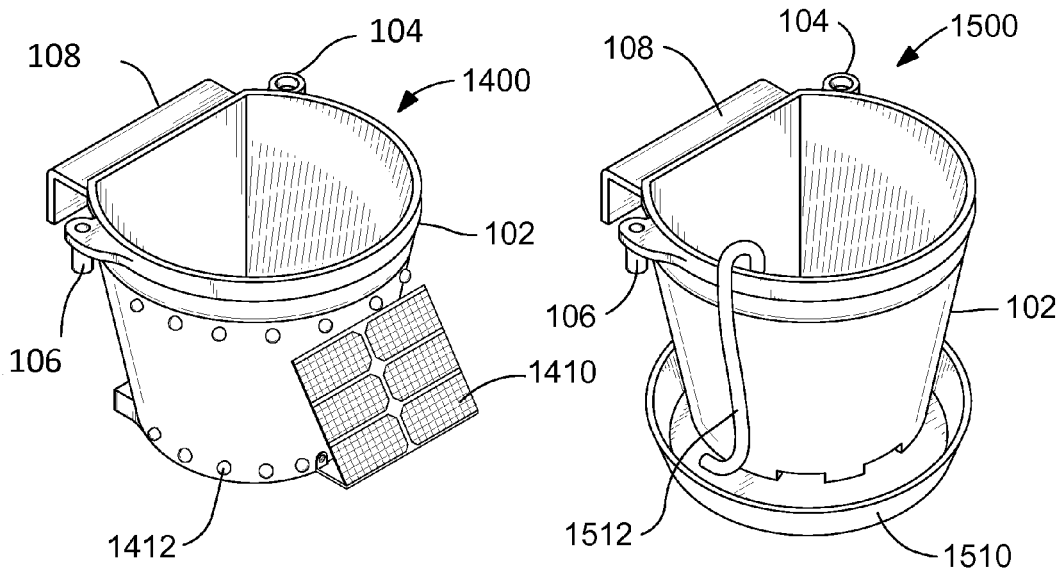
FIG. 14 is a perspective view of a pot with solar panels and/or lighting for use in a potting system, in accordance with an embodiment of the invention.
FIG. 15 is a perspective view of a pot with a water receptacle for use in a potting system, in accordance with an embodiment of the invention.

FIG. 14 is a perspective view of a pot with solar panels and/or lighting for use in a potting system, in accordance with an embodiment of the invention. In some embodiments, system 1400 includes a pot 102, a solar panel 1410, and lighting 1412 that is configured to suspend from one or more bands 101 (FIG. 1) using a suspension mechanism 108. In some embodiments, pot 102 is configured to link with adjacent pots, feeders, and/or houses using a linking mechanism 104 and/or 106 to define a chain (FIG. 10). System 1400 may be implemented with any embodiment disclosed herein.

In some embodiments, the solar panel 1410 is configured to provide a power source to one or more power consuming devices, such a light, a watering mechanism, a heating element, a cooling element, or other similar power consuming device. For example, the solar panel 1410 may include a single solar cell or a plurality of solar cells. Additionally, the solar panel 1410 may be integrated into the pot 102 or may be mounted to one or more portions of the pot 102. Alternatively, the solar panel 1410 may be positioned on a side, top, bottom, or off of the pot 102. Additionally, the solar panel 1410 may be mechanically or automatically movable, shiftable, detachable, or rotatable, such as to be positioned in a line of the sun or to trace movement of the sun. Also, the solar panel 1410 may be configured to store energy, such as using a battery.

In some embodiments, lighting 1412 is configured to provide illumination for decorative or safety purposes. For example, lighting 1412 may include one or a plurality of lighting elements. Additionally, lighting 1412 may include low or high intensity light or adjustable intensity light. Also, lighting 1412 may be positioned on a side, top, bottom, or interior of the pot 102. Alternatively, lighting 1412 may be configured to direct illumination on an interior of the pot 102. Further, lighting 1412 may be configured to direct illumination on an exterior of the pot 102. Moreover, lighting 1412 may be configured to provide a regular or irregular decorative pattern. Additionally, lighting 1412 may illuminate in response to darkness or proximity/absence of an animal, insect, human, or other object.

FIG. 15 is a perspective view of a pot with a water receptacle for use in a potting system, in accordance with an embodiment of the invention. In some embodiments, system 1500 includes a pot 102, a water receptacle 1510, and a water dispensing mechanism 1512 that is configured to suspend from one or more bands 101 (FIG. 1) using a suspension mechanism 108. In some embodiments, pot 102 is configured to link with adjacent pots, feeders, and/or houses using a linking mechanism 104 and/or 106 to define a chain (FIG. 10). System 1500 may be implemented with any embodiment disclosed herein.

In some embodiments, the water receptacle 1510 is configured to retain water for watering purposes and/or cleanliness purposes. For example, the water receptacle 1510 may include a reservoir coupled to a bottom of the pot 102. Additionally, the water receptacle 1510 may be configured to capture water from one or more holes in the pot 102. Further, the water receptacle 1510 may be configured to capture falling rain water. Alternatively, the water receptacle 1510 may be a different shape, such as a square, oval, rectangle, circle, triangle, diamond, or any other regular or irregular shape. Also, the water receptacle 1510 may include a container for storing water from the pot 102, falling rain water, and/or from a hose, faucet, or other manual supply source. Additionally, the water receptacle 1510 may be positioned on a side, below, above, or off the pot 102. Further, the water receptacle 1510 may include two or more receptacles, such as one for water and one for fertilizer.

In some embodiments, the water dispensing mechanism 1512 is configured to dispense water from the water receptacle 1510 to the pot 102. For example, the water dispensing mechanism 1512 may operate manually, electronically, electromechanically, as a siphon, or through another similar means. Additionally, the water dispensing mechanism 1512 may include a timer to govern time and/or volume of water disbursement. Further, the water dispensing mechanism 1512 may include a sprinkler head to spread water over an area while being dispensed. Also, the water dispensing mechanism 1512 may include an adjustable or removable sprinkler head. Moreover, the water dispensing mechanism 1512 may dispense water from one or more water receptacles 1510 to two or more pots 102. Alternatively, the water dispensing mechanism 1512 may include a power source, which power source may be charged using a solar panel. Additionally, the water dispensing mechanism 1512 may include dumping of the water receptacle 1510 to the pot 102.

Figures 16, 17:
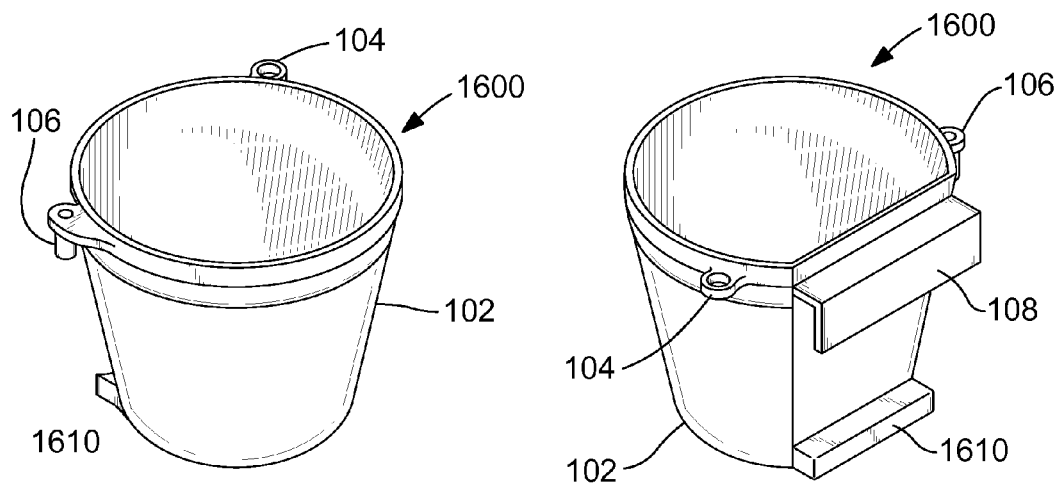
FIGS. 16 and 17 are perspective views of a pot with stability post for use in a potting system, in accordance with an embodiment of the invention.

FIGS. 16 and 17 are perspective views of a pot with stability post for use in a potting system, in accordance with an embodiment of the invention. In some embodiments, system 1600 includes a pot 102 and a stability post 1610 that is configured to suspend from one or more bands 101 (FIG. 1) using a suspension mechanism 108 (FIG. 17). In some embodiments, pot 102 is configured to link with adjacent pots, feeders, and/or houses using a linking mechanism 104 and/or 106 to define a chain (FIG. 10). System 1600 may be implemented with any embodiment disclosed herein.

In some embodiments, the stability post 1610 is configured to support the pot 102 against a structure to retain the pot 102 in an upright position. For example, the stability post 1610 may include an extension positioned at a lower rear portion of the pot 102. Alternatively, the stability post 1610 may include one or more rods, blocks, or tongues. Also, the stability post 1610 may be curved. Also, the stability post 1610 may include length, height, width, curvature, or rotational adjustability. Further, the stability post 1610 may include a pointed or sharpened edge for resting against a structure. Alternatively, the stability post 1610 may be suspended from one or more bands 101. Further, the stability post 1610 may be insertably removable with the pot 102. Additionally, the stability post 1610 may be in a form of a ridge or elongated member or flattened structure. Furthermore, the stability post 1610 may slidably extend from the pot 102 to adjustably define different extension distances, such as to accommodate support against various shaped structures. For example, the stability post 1610 includes a panel slidably coupled on a bottom portion of the pot 102 with a push/pull tab accessible from a front of the pot 102 that is usable to adjustably extend the stability post 1610 against a structure.

Figure 18:
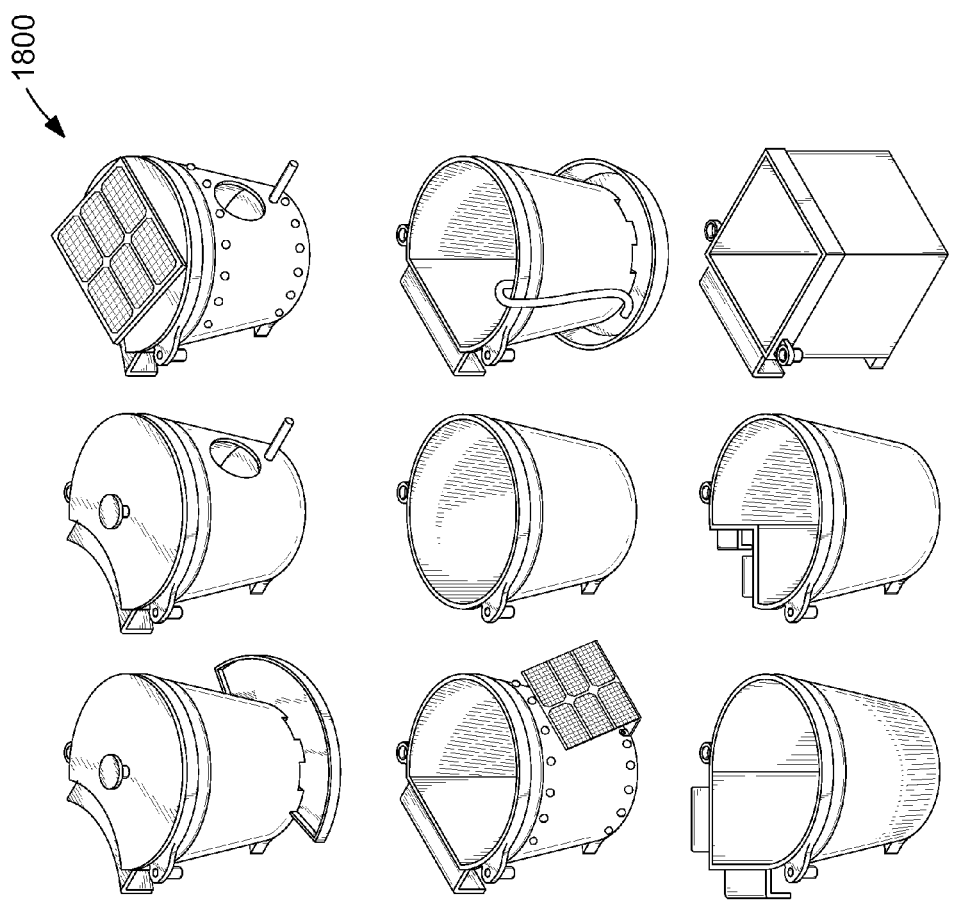
FIG. 18 is a perspective view of a potting system kit having one or more pots, bands, feeders, houses, seeds, and/or food, in accordance with an embodiment of the invention; and APPENDIX A includes examples of a potting system, in accordance with various embodiments of the invention.
Figure 18:
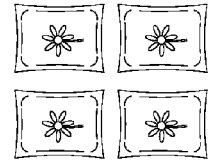
Figure 18:
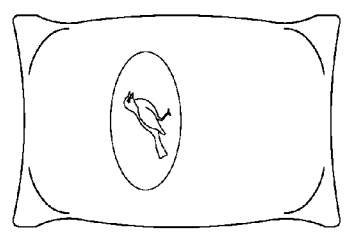
Figure 18:
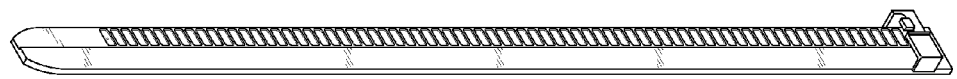

FIG. 18 is a perspective view of a potting system kit having one or more pots, bands, feeders, houses, seeds, and/or food, in accordance with an embodiment of the invention. In some embodiments, potting system kit 1800 may include alternative components as any combination of any amount of any embodiment disclosed herein is possible. In some embodiments, the potting system kit 1800 or its components may be determined using an automated software system that receives input of trees, posts, beams, or other structures and recommends components based on the same. In some embodiments, components of the potting system kit 1800 may be automatically ordered, such as by a monitoring system disposed within a feeder that monitors the volume of food remaining or by a monitoring system disposed within a pot that monitors the season and need for seeds.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A potting system comprising:
   at least one band; and
   at least one pot, the at least one pot configured to suspend from the at least one band, the at least one pot comprising:
      a male connector including at least a cylindrical post; and
      a female connector including at least a cylindrical recess,
   wherein each pot is configured to link the male connector with the female connector of another adjacent pot or vice-versa which enables swiveling between each pot.

2. The potting system of claim 1, wherein the at least one band comprises:
   at least a plurality of gears across a partial width of a side of a band, the plurality of gears adjacent to a bottom portion of the side of the band.

3. The potting system of claim 1, wherein the at least one band is
   configured to tensionally wrap around a structure using a locking mechanism.

4. The potting system of claim 1, wherein the
   at least one band is configured to fasten to a structure.

5. The potting system of claim 1, wherein the at least one band comprises:
   an extensible band.

6. The potting system of claim 1, wherein the at least one pot configured to swivably link with adjacent pots using opposing male and female connectors as a linking mechanism.

7. The potting system of claim 1, wherein the
at least one pot and the at least another pot are configured to swivably link enabling a grouping of pots to define at least one of a circular, oval, elliptical or squarish grouping of pots.

8. The potting system of claim 1, wherein the at least one pot configured to suspend from a band comprises:
using one or more fasteners.

9. The potting system of claim 1, wherein the at least one pot configured to suspend from a band comprises:
having a concave, flat, inverted, or everted portion configured to suspend from the band.

10. The potting system of claim 1, wherein the at least one pot configured to suspend from a band comprises:
having a circular, square, rectangle, or other regular or irregular shape configured to suspend from the band.

11. The potting system of claim 1, wherein the at least one pot configured to suspend from a band comprises:
at least one pot and at least another pot configured to suspend from the band to define a combined circular, square, rectangle, or other regular or irregular shape.

12. The potting system of claim 1, wherein the at least one pot is configured to suspend from a band:
around a structure.

13. The potting system of claim 1, wherein the at least one pot configured to suspend from a band:
is configured to suspend from a band horizontally, vertically, or angularly on a structure.

14. The potting system of claim 1, further comprising:
one or more spacer belts, comprising:
a male connector on a first end; and
a plurality of female connectors along the spacer belt,
wherein the spacer belt may be cut to a desired distance of separation, wherein the male connector on the first end of the spacer belt is configured to link with a female connector linking mechanism of a pot, and wherein a female connector at an end of the spacer belt opposite the first end is configured to link with a male connector linking mechanism of a pot.

15. The potting system of claim 1, wherein the at least one band comprises:
a locking mechanism, the locking mechanism comprising an integrated gear rack with a ratchet within a small case opening.

16. The potting system of claim 1, further comprising:
one or more feeders or houses configured to suspend from the at least one band.

17. The potting system of claim 1, wherein the at least one pot configured to suspend from a band comprises:
using one or more hooks.

18. The potting system of claim 17, wherein the at least one pot configured to suspend from a band using one or more hooks comprises:
using one or more concave, flat, inverted, or everted hooks.

19. The potting system of claim 17, wherein the at least one pot configured to suspend from a band using one or more hooks comprises:
using one or more substantially linear, curvilinear, or angled hooks.

20. A potting system comprising:
one or more bands, the one or more bands comprising:
an interior side, the interior side disposed adjacent to a tree or other structure;
an exterior side opposite to the interior side;
a bottom edge, the bottom edge disposed nearest the ground;
a top edge, the top edge opposing to the bottom edge;
a width of the exterior side, the width of the exterior side measured from the bottom edge to the top edge;
a plurality of gears, the plurality of gears disposed along the exterior side adjacent to the bottom edge, the plurality of gears extending towards the top edge partially across the width of the exterior side, the plurality of gears covering the bottom portion of the exterior side; and
an integrated gear rack with a ratchet within a small case opening as a locking mechanism;
one or more pots configured to suspend from the top edge of the one or more bands, the one or more pots configured to suspend from the one or more bands including the one or more pots configured to link with adjacent pots using opposing male and female connectors as a linking mechanism, the male connector including at least a cylindrical post and the female connector including at least a cylindrical recess, wherein linking of a cylindrical post of a first pot and a cylindrical recess of a second pot enable adjacent pots to swivel relative to one another; and
one or more spacer belts, comprising a male connector on a first end of the spacer belt, the male connector configured for linking with a female connector of a first pot, and a female connector at an end of the spacer belt opposite to the male connector, the female connector configured for linking with a male connector of a second pot.

* * * * *